United States Patent

Frenk

[11] 4,001,658
[45] Jan. 4, 1977

[54] OSCILLATOR FOR NON-SINUSOIDAL MOVEMENTS

[75] Inventor: Helmuth Frenk, Wetzlar, Germany

[73] Assignee: Ernst Leitz GmbH, Germany

[22] Filed: Oct. 17, 1975

[21] Appl. No.: 623,544

Related U.S. Application Data

[63] Continuation-in-part of Ser. No. 460,680, April 15, 1974, abandoned.

[30] Foreign Application Priority Data

Apr. 16, 1973  Germany ........................ 2319224

[52] U.S. Cl. ................................. 318/37; 73/71.6; 310/15; 310/29; 331/116 M
[51] Int. Cl.² ........................................ H02K 33/00
[58] Field of Search ....................... 73/71.6; 350/6; 318/110, 37, 35, 38, 127–132, 122, 123; 310/15, 22, 21, 25, 27, 29; 331/159, 106, 116, 116 M

[56] References Cited

UNITED STATES PATENTS

| 3,020,751 | 2/1962 | Wohl | 73/71.6 |
| 3,076,153 | 1/1963 | Rieckman et al. | 310/22 X |
| 3,331,239 | 7/1967 | Larsen et al. | 328/130 X |
| 3,486,094 | 12/1969 | Zane | 318/128 |
| 3,525,887 | 8/1970 | D'Ewart, Jr. | 310/27 |

Primary Examiner—Donovan F. Duggan
Attorney, Agent, or Firm—Gilbert L. Wells

[57]      ABSTRACT

An oscillator for generating non-sinusoidal, preferably triangular movements from a harmonic synthesis of individual sine oscillations. The oscillator comprises a plurality of mechanically intercalated resilient oscillator systems which each comprise an exciter drive means drivingly coupled to an oscillatable element. Each oscillator system has a natural frequency chosen in accordance with Fourier analysis of the oscillatory motion to be synthesized. From the total of the natural frequencies the desired motion is generated.

9 Claims, 3 Drawing Figures

OSCILLATOR FOR NON-SINUSOIDAL MOVEMENTS

CROSS REFERENCES TO RELATED APPLICATIONS

The present application is a Continuation-In-Part of Application Ser. No. 460,680, filed Apr. 15, 1974 and now abandoned.

Applicant claims priority under 35 U.S.C. 119 for Application P 23 19 224.7, filed Apr. 16, 1973 in the Patent Office of the Federal Republic of Germany. A copy of the priority document is in the file of Application Ser. No. 460,680.

BACKGROUND OF THE INVENTION

The present invention relates to a mechanical oscillator for non-sinusoidal, preferably triangular movements generated by harmonic synthesis of individual sine oscillations.

It is known to achieve triangular oscillations via the intermediate step of trapezoidal oscillations thereby, that one provides an arrangement executing sinusoidal oscillations and from the oscillations executed by this arrangement allows at any time only the oscillation components to come to effect, which are far-reachingly similar to the desired triangular oscillation, while one lets the remaining parts of the sine movement be swamped in dead times (switching off of the evaluating receiver). The disadvantage of this method resides in the relatively large sum of dead times, during which the apparatus is not available according to operation.

It is further known to split up arbitrary one-dimensional oscillations mathematically by Fourier analysis into defined sine oscillation. This splitting up can be accomplished mechanically or electronically by harmonic analyzers.

Reversal of the harmonic analysis permits the synthesis of a desired oscillation movement from computed values of sine movements. For this, there are known arrangements, which generate individually the required fundamental oscillations and overtones, which are then put together by a mechanical, electrical or optical coupling into the desired oscillation movement.

The oscillators employed in these arrangements are excited into forced oscillations with defined phase and amplitude position, at all events previously no particular consideration being given to the position of the resonance point.

In the case of devices of this kind, which are thought of as demonstration machines and which operate apart from the resonance frequency, a not inconsiderable energy consumption occurs, which makes impossible their application for technical purposes, in which only little energy is available (for example in the case of space travel).

Beyond this, in the case of rotating systems for the generation of a harmonic synthesis there exists as a further disadvantage the maintenance problem of bearings, in particular then, when the apparatus is to operate in a vacuum. It is, therefore, an object of the present invention to overcome the aforedescribed disadvantages.

SUMMARY OF THE INVENTION

The above-stated object is attained by providing a mechanical oscillator for generating a non-sinusoidal oscillatory motion by harmonic synthesis of a plurality of substantially sinusoidal oscillations. The oscillator comprises a plurality of mechanically intercalated resilient oscillatory systems each comprising respective exciter drive means drivingly coupled to a mechanically oscillatable element having a respective natural frequency chosen in accordance with Fourier analysis of the oscillatory motion to be synthesized.

In this case of mechanical systems, the fundamental frequencies may never by set precisely to the prescribed frequency so that an excited system deviates from the intended movement by small alterations of the phase and amplitude position of the individual oscillations.

It is therefore necessary to follow the movement electronically and to correct the excitation of the mechanical system.

BRIEF DESCRIPTION OF THE DRAWINGS

The invention will be more readily comprehended from the following description when taken in conjunction with the appended drawings, wherein.

DESCRIPTION OF THE PREFERRED EMBODIMENTS

Figure 1:
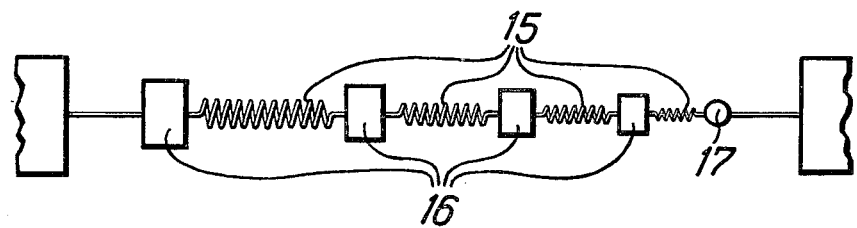
FIG. 1 shows an arrangement of intercalated oscillators provided with helical springs.

Referring now to the drawings, in FIG. 1 there is represented a system with four intercalated mechanical oscillators, springs 15 of which are so coordinated with masses to be moved that their respective natural resonant frequencies correspond as nearly as possible to the desired overtones of the system. The mechanical oscillators are controlled individually by respective drive means 16, as for instance electromagnetic means as disclosed in U.S. Pat. No. 3,076,153 or a permanent magnet as disclosed in U.S. Pat. No. 3,525,887, or any other means of this art well known as piezoelectrically or hydraulically excited vibrators.

The innermost system, in this example, executes the fourth overtone in the fourth approximation of the Fourier analysis and thus controls the entire movement for a transmission mechanism 17 which, for example, consists of a mirror. The four oscillators are mechanically connected between two fixed supports, the drive means 16 on the extreme left in FIG. 1 imparts oscillatory torsional motion to the corresponding spring 15 at a frequency corresponding to the fundamental component. The resulting fundamental oscillatory motion is imparted to the second drive means 16 and the latter is driven at a frequency corresponding to the first requisite overtone component of the oscillatory motion to be synthesized. Thus, the second spring 15 is subjected to both an oscillatory motion corresponding to the fundamental component and to an oscillatory motion corresponding to the first requisite overtone. The transmission element 17 thus responds to each of the component oscillations and is coupled to the right hand support in FIG. 3 by a torsionally displaceable element.

Alternatively, the drive means 16 are adapted to impart reciprocatory motion to the respectively associated springs 15 and in these circumstances the transmission element 17 is connected to the rigid support on the extreme right of FIG. 1 by a resilient element which permits the transmission element to respond to the sum of the component reciprocatory oscillations.

When the apparatus of FIG. 1 of the present invention is operative in accordance with the alternative mode, then obviously component 17 cannot simultaneously oscillate (or vibrate) and be rigidly connected to a support.

Rather, in the schematic of FIG. 1, it is to be so construed, that component 17 is supported in fixed but rotatable manner so that, for instance in the form of a mirror, it performs the desired non-sinusoidal rotary oscillations, while springs 15 and elements 16 oscillate linearly. The transmission of the latter oscillations to component 17 may be effected for instance by means of a lever arm.

In order to achieve the effect described in the present application, there is a determination of springs 15 and 16. This is done as follows:

1. determination of the moment of inertia of component 17.
2. converting the moment of inertia into the equivalent means $m_n$ at the point of action of the last spring 15 (for instance at the end of the lever arm opposite that end supporting component 17).
3. determining the spring constant $D_n$ of this last spring by the formula $$D_n = 4m_n\pi^2 f^2_n$$

wherein $f_n$ is the $n$th harmonic of the non-sinusoidal oscillation.

Then the total mass $m_{n-1}$ of the structure oscillating in the $n$th harmonic is formed. To this is added the mass $m_n$ of component 17, the mass of spring 15 and the mass of the last component 16. This last one is adjusted as closely as possible to the natural frequency of the next lower harmonic $f_{n-1}$, $D_{n-1}$ being computed by the formula of (3). This process is repeated until all the springs 15 have been determined.

Obviously the computed spring constants $D_1 \ldots D_n$ and also the masses $m_1 \ldots m_n$ are designed within a given tolerance for accuracy.

The larger the deviations of the individual natural frequencies from the exact values of the harmonics, the larger the powers required to force the accurate oscillations.

However, no rigorous constraints are required for the functioning.

If tighter tolerances are desired, then the individual frequencies are adjusted more closely, for instance by adding adjusting masses. However, this process is to be considered as "fine control" as conventional in any precise final adjustment.

The desired result obtainable by means of this equipment therefore is: the natural frequencies of individual springs 15 together with all the masses to the right from them in FIG. 1 of the application, including spring 15 and element 16, are as close as possible to the desired fundamental and harmonic frequencies of the desired nonsinusoidal oscillations.

Figure 2:
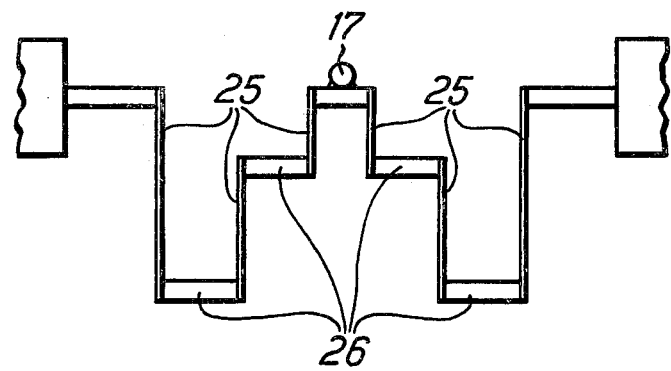
FIG. 2 shows an arrangement of intercalated oscillators provided with leaf springs.

In FIG. 2 leaf springs 25 and drive means 26 are disposed symmetrically with respect to one another and represented up to the third approximation of the Fourier analysis. The mode of operation of the driving and oscillating components is in principle as described in FIG. 1. In FIG. 2, the transmission element is represented by a mirror 27.

The leaf spring oscillators are preferably subjected to torsional oscillatory motion and are so supported between rigid supports that the oscillatory systems can each respond to such torsional displacement.

Figure 3:
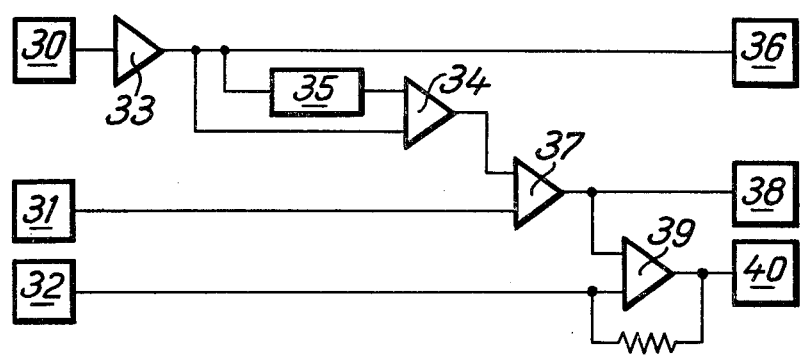
FIG. 3 shows a circuit arrangement for the electronic correction of the oscillating systems to be excited.

FIG. 3 shows a block schematic circuit diagram of an electronic circuit for electronic correction of the oscillating system to be excited.

The fundamental oscillation is generated in known manner by positive feedback coupling, in that the voltage, which is generated in a scanning head 30 and which corresponds to the actual oscillation, is fed — amplified by electronic means 33 — to exciter drive means 36. An initial excitation may be derived from vibrations of the surroundings, from a switching-on pulse, or from the amplifier noise of the circuit itself. Amplitude limitation is provided by the power limit of the amplifier 33 or by other means. The more highly oscillating systems are excited in contrast to the fundamental oscillation, into forced oscillations, the frequency of which at all events lies near to the resonance point. The drive voltage corresponding to the oscillators for producing the necessary overtone components is derived from the scanning voltage of the natural oscillation, as follows:

1. The scanning voltage is converted by electronic components 35 as disclosed in U.S. Pat. No. 3,486,094 or consisting of an open loop amplifier (Schmitt Trigger) known per se and an integrator as shown by National Semiconductor Corporation in Linear Applications, 1972 at page AN 20-4, into the desired non-sinusoidal form of an ideal voltage, for example, into a substantially triangular wave form.
2. The actual scanning voltage corresponding to the fundamental component of the oscillation is compared by means of a differential amplifier 34 with this ideal voltage, with correct phase and amplitude, and amplified. The obtained differential voltage is employed for the excitation of the respective systems corresponding to the necessary overtone components.
3. The electronically obtained scanning voltage 31 of the first overtone is compared with the ideal value in the differential amplifier 37 and amplified: for this difference shows the deviation of the first overtone in phase and amplitude values.
4. The no longer correctable remainder of the first overtone is fed as ideal value of the further overtones to a differential amplifier 39, in order to be compared with the actual value of the second overtone and amplified, the output voltage again driving the second overtone mechanical oscillator.

Further overtone oscillations may be driven in an equivalent manner. The output of the differential amplifier 39 is connected via a feedback network to one of the inputs of the differential amplifier 39. As shown in FIG. 3, the feedback network consists of a resistor 41.

A mechanical oscillator embodying the invention achieves in advantageous manner that by its aimed at construction from corresponding systems operating in fundamental oscillations, there is available a technically utilizable machine, which is low in energy consumption and operates reliably, as is very much desired for example as a scanner in the case of satellites.

I claim:

1. A mechanical oscillator for generating a non-sinusoidal oscillatory motion by harmonic synthesis of a plurality of substantially sinusoidal oscillations, the oscillator comprising a plurality of mechanically intercalated resilient oscillatory systems each comprising respective exciter drive means (15) drivingly coupled to a mechanically oscillatable element (16), each oscillator system having a respective natural frequency chosen in accordance with Fourier analysis of the oscillatory motion to be synthesized.

2. An oscillator as claimed in claim 1, comprising a mechanically oscillatable element having a natural frequency corresponding to the frequency of the fundamental component of the motion to be synthesized, and at least one further element having a respective natural frequency corresponding to an odd multiple of the frequency of the fundamental component.

3. An oscillator as claimed in claim 2, wherein the wave form of the motion is substantially triangular.

4. An oscillator as claimed in claim 2, wherein the wave form of the motion is substantially rectangular.

5. An oscillator as claimed in claim 1, comprising a mechanically oscillatable element having a natural frequency corresponding to the frequency of the fundamental component of the motion to be synthesized, and at least one further mechanically oscillatable element, the or each further element having a respective natural frequency corresponding to an even multiple of the fundamental component.

6. An oscillator as claimed in claim 5, wherein the wave form of the motion is substantially saw-toothed.

7. An oscillator as claimed in claim 1, comprising
  a. a plurality of transducers each responsive to the oscillation of a respective one of the mechanically oscillatable elements to provide an electrical signal;
  b. a signal generator to generate an electrical signal having a wave form correponding to the motion to be synthesized; and
  c. means for comparing the signals derived from the respective transducers with the reference signal to provide a plurality of control signals for controlling the drive means associated with the respective mechanically oscillatable elements.

8. An oscillator as claimed in claim 7, comprising
  a. amplifier means having input means connected to the transducer responsive to the mechanically oscillatable element corresponding to the fundamental component;
  b. output means connected to the respective drive means associated with that element to provide feedback to reduce any deviation of the mechanical oscillation from the theoretically necessary fundamental component of the oscillatory motion to be synthesized;
  c. wave form shaping means connected to the output means of the amplifier means;
  d. a first differential amplifier means having first input means connected to the output means of the amplifier means and second input means connected to output means of the shaping means; and
  e. at least one further differential amplifier means, the or each further differential amplifier means corresponding to a respective overtone component of the motion to be synthesized and having first input means connected to the output means of the preceding differential amplifier, second input means connected to output means of a respective one of the transducers corresponding to the respective overtone component, and output means connected to the drive means associated with the mechanically oscillatable element corresponding to the overtone component.

9. An oscillator as claimed in claim 8, wherein the wave form shaping means comprises a phase shift network, a trigger element and integrator means.

* * * * *